United States Patent [19]

Plaot

[11] Patent Number: 4,919,501

[45] Date of Patent: Apr. 24, 1990

[54] OPTO-MECHANICAL DEFLECTOR

[75] Inventor: Michael Plaot, Eschborn, Fed. Rep. of Germany

[73] Assignee: Linotype AG, Eschborn, Fed. Rep. of Germany

[21] Appl. No.: 300,250

[22] Filed: Jan. 23, 1989

Related U.S. Application Data

[63] Continuation-in-part of Ser. No. 136,736, Dec. 22, 1987, abandoned.

[30] Foreign Application Priority Data

Dec. 23, 1986 [DE] Fed. Rep. of Germany ....... 3644124

[51] Int. Cl.$^5$ .......................... G02B 26/10; G02B 3/06
[52] U.S. Cl. ...................... 350/6.8; 350/433
[58] Field of Search ............... 350/6.5, 6.6, 6.7, 6.8, 350/6.9, 6.91, 474, 475, 484, 619

[56] References Cited

U.S. PATENT DOCUMENTS

| | | | |
|---|---|---|---|
| 3,198,951 | 8/1965 | Lentze | 350/6.8 |
| 4,512,625 | 4/1985 | Brueggeman | 350/6.8 |
| 4,629,283 | 12/1986 | Plaot | 350/6.8 |

FOREIGN PATENT DOCUMENTS

| | | |
|---|---|---|
| 0152882 | 8/1985 | European Pat. Off. . |
| 1302732 | 12/1970 | Fed. Rep. of Germany . |
| 2352314 | 12/1977 | France . |
| 0127210 | 6/1985 | Japan . |

Primary Examiner—Bruce Y. Arnold
Assistant Examiner—Ronald M. Kachmarik
Attorney, Agent, or Firm—William F. Thornton

[57] ABSTRACT

An opto-mechanical deflector system for an imaging system comprises at least one scanning mirror struck by a collimated light beam focused onto a flat image plane by a first plano-convex lens, a concave mirror and an aplanatic lens system containing a plano-concave lens and a second plano-convex lens between said scanning mirror and said first plano-convex lens, the refractive indices of said first plano-convex lens and said plano-concave lens being substantially indentical and the refractive index of said second plano-convex lens being substantially less than that of said plano-concave lens.

7 Claims, 2 Drawing Sheets

OPTO-MECHANICAL DEFLECTOR

This is a Continuation-in-Part of application Ser. No. 07/136736 filed Dec. 22, 1987, abandoned upon the filing of the application which resulted in this patent.

BACKGROUND OF THE INVENTION

This invention relates to an opto-mechanical deflector for an imaging system.

Related prior art opto-mechanical deflectors are typically employed in a typographic setting device in order to project typographic characters along a deflection line into a planar face, or light-sensitive film plane. Such typographic setting devices including the prior art opt-mechanical deflector project a beam bundle or collimated light beam onto a rotatable or slewable scanning mirror, whence the beam is projected onto a flat image plane in such a manner that the relation between the deflection angle of the beam bundle at the rotatable mirror and the position of the beam bundle projected into a deflection line is linearized by the optical system between the rotatable mirror and the flat image plane. Such a system is disclosed in German Patent No. P 34 04 407.1, U.S. Pat. No. 4,629,283. In detail, this optical system includes, near the rotatable mirror, a plano-convex lens with an approximately planar face facing the rotatable mirror and a spherically-convex face facing the reflection plane or the flat image plane, and, following it, a field-flattening concave mirror. The spherically reflecting face of the concave mirror is directed to the flat image plane. Before the rotatable mirror, there may be arranged in the beam path an objective lens and a disperson lens which are to serve, inter alia, a pre-correction of the spherical aberration of the deflection system. Starting from an intermediate image plane into which an image point of a character can be projected, the beam bundle traverses through the dispersion lens, the objective lens and, preferably, through a spherically-convex face of a plane-convex lens and exits from its planar face as a bundle of collimated light. The later impinges on the rotatable reflecting face and, depending on the rotation position, is reflected into a plano-convex lens in order to finally be projected into the deflection line. The planar face of the plano-convex lens thereby reduces the deflection angle of the rotatable mirror required for the deflection of the position of the character projected in the deflection line. This reduction is substantially obtained by refraction at the planar face of the plano-convex lens. The beam bundle traversing through this lens is then, at its exit at its spherically-convex face, focused substantially into the position in the deflection line, i.e. further optical elements of the deflection system add correctingly to the focusing. The requirement that the plano-convex single lens be an aplanatic one, requres a relatively strong glass thickness of this single lens. While by means of this opto-mechanical deflector and the additional lenses, particularly the dispersion lens, in the entry beam path, a very good linearity between the deflection angle or the rotation position of the rotatable mirror and the projection position in the flat image plane is obtained if the deflection angle of the rotatable mirror is not too great, or the deflection line, at a given focal length of the plano-convex lens, is not too long. It is, however, in cases of particularly long deflection lines and high quality requirments desirable to still better correct the unavoidable aberration of the larger concave mirror provided near the image plane. It is therefore the aim of the present invention to further improve the correction of this aberration of the concave mirror in an opto-mechanical deflector system of the kind referred to in the beginning, particularly in case of long deflection lines.

SUMMARY OF THE INVENTION

The optical system following the rotatable or slewable scanning mirror therefore includes two major elemnets, viz., in addition to the first plane-convex lens forming a -second- aplanatic system, a first concave aplanatic system.

The improved optical system following the rotatable or slewable scanning mirror includes two major elements, viz., in addition to the first plano-convex aplanatic lens, a first concave aplanatic system. The term aplanatic system designates a lens combination reducing the aberration. The approximately flat plane of the second plano-convex lens which belongs to the concave aplanatic system, is facing the rotatable mirror. This second plano-convex lens consists of a glass of a refractive index as low as possible which determines the high duty ratio. This second plano-convex lens consists of a glass of a refractive index as low as possible which determines a high refractive index difference between the plano-convex lens and the concave-plano lens, both forming together the concave aplanatic system. This refractive index difference determines the numerical aperture enhancement by the aplanatic system and thus the aperture reduiction on the rotatable deflector. The small the aperture on the rotatable deflector, the larger the angle of deflection possible without aperture fall-off from the deflector. For a given deflector size therefore a larger refractive index difference as mentioned above results in a higher duty ratio. The duty ratio is defined as the difference of the time for sweeping the deflection line length by means of the rotatable mirror or a facet of a polygon less the not-utilizable dead time during the transition of two mirror faces of two facets relative to the time for sweeping the deflection line length. by means of a mirror face or facet.

A range of acceptable indices of refraction for the first plano-convex lens is from 1.6 to 1.95. The preferred value is 1.68.

A range of acceptable indices of refraction for the second plano-convex aplanatic lens is from 1.45 to 1.55 with the preferred value being 1.51.

The reverse surface, averted from the scanning mirror, of the second plano-convex lens includes a small radius selected according to the optical edge conditions. The concave face of the plano-concave lens closely contacts to the convex face of the second plano-convex lens. In total, the first concave aplanatic system consisting of the plano-concave lens and the second plano-convex lens, focuses an image of an ojbect (character laser point) which is opticallly in the indefinite, to a virtual point near the planar face of the second plano-convex lens. This point is thus on the same side from which the beam bundle impinges from the object point in the indefinite onto the flat plane. The aberration in the edge areas of the field flattening concave mirror is reduced by the composition of the plano-convex lens and the plano-concave lens constituting the first concave aplanat and of the first plano-convex lens.

The opto-mechanical deflector according to the invention has the additional advantage that the entrance angle on the flat face of the second plano-convex lens of the concave aplanatic system may be selected in a larger range, because this aplanatic system can be used for additional correction to ensure image quality. A typical value of the entrance angle of the prior art deflector of German patent No. 34 04 407.1 is 37 degrees. According to the invention, for example 43 degrees are achieved.

With the greater entrance angle, the duty ratio is at the same time improved.

The first plano-convex lens which constitutes a major element of the opto-mechanical deflector is aplanatic relative to the image which is projected from the virtual near point.

The virtual near point formed by the first concave aplanatic system is focused by the first plano-convex lens as a curved line behind the concave mirror which again projects the curved line as a straight deflection line into the flat image plane. The first plano-convex lens should have approximately the same refractive index as the plano-concave lens of the first aplanatic system in order to keep the total focal length of the system small and to reduce the optical level arm effecting the rotatable mirror. In order to reduce the glass thickness of the first plano-convex lens constituting one major element, thus reaching an advantage in the manufacturing process, and in order to obtain a high exactness of the curved line into which the first plano-convex lens focuses the near point, a glass plate is advantageously cemented to the planar face of the first plano-convex lens. The refractive indices of the glass plate and of the first plano-convex lens may be identical, identical refractive indices of glass plate and of the first concave lens are provided for ease of manufacturing. Different refractive indices are chosen for design purposes, e.g. fine tuning of corrections.

In a first variant the glass plate has a medium refractive index, particularly in the range between that of the second plano-convex and that of the first plano-convex lens. Compare in this connection the ranges of the indices of refraction of the first and second plane-convex lenses. The glass plate is in this case cemented to the flat face of the plano-concave lens of the first aplanatic system.

In a second variant in which an air gap is provided between the glass plate and the flat face of the plano-concave lens of the first aplanatic system the glass plate has a high refractive index, particularly more than that of the first plano-convex lens.

BRIEF DESCRIPTION OF THE DRAWINGS

In the following specification and claims the invention will be described in greater detail made with reference to the drawings wherein:

In both Figures, correpsonding portions are referred to by corresponding reference numerals.

DETAILED DESCRIPTION OF THE INVENTION

Figure 1:
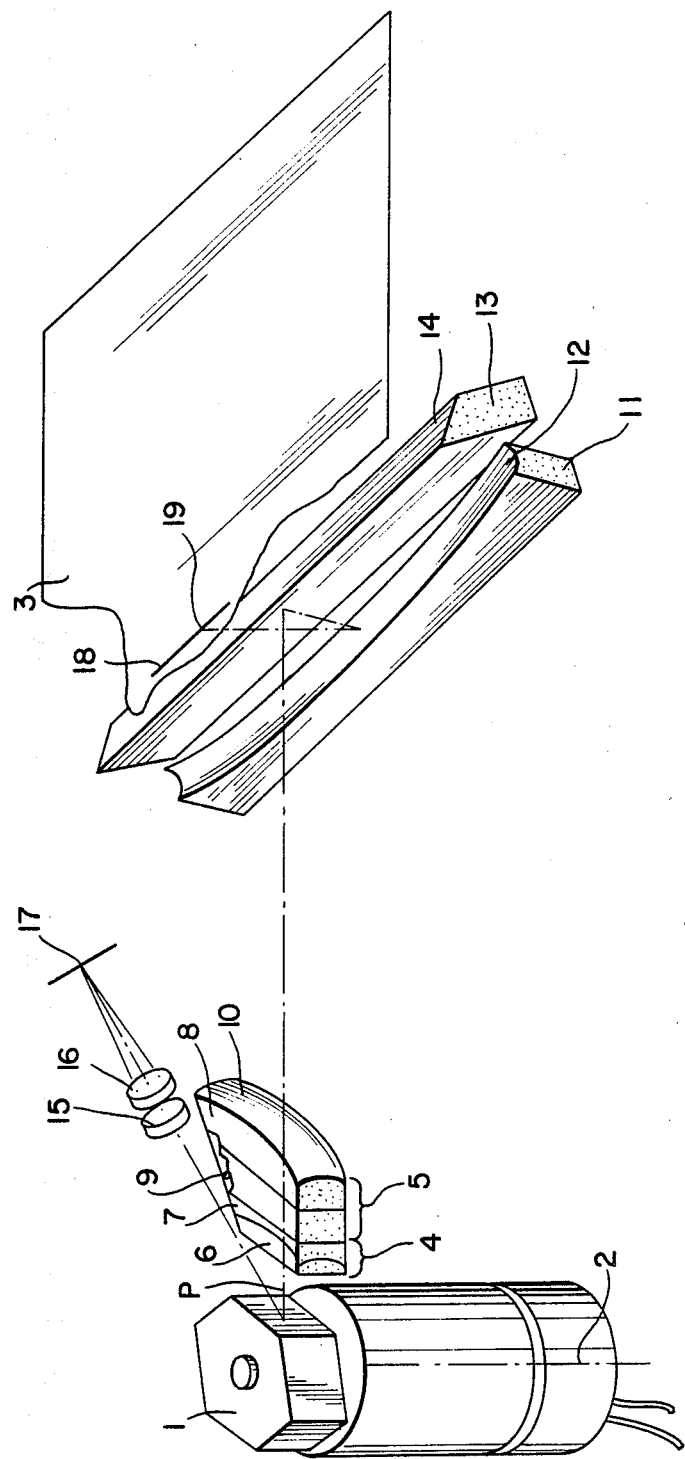
FIG. 1 is a schematic illustration of a typographic typesetting device including the opto-mechanical deflector of a first embodiment.

In FIG. 1, a polygon marked by 1 includes six facets as rotatable faces. The imaginary rotation axis is shown in a dash-dot line 2. In the beam path between polygon 1 and a flat image plane 3 shaped as a light-sensitive film there are two aplanatic systems 4 and 5 cemented to each other. These aplanatic systems form the major elements of the optical system.

The first concave aplanatic system 4 consists of a first plano-convex lens 6 and a plano-concave lens 7 cemented to its convex side.

The second convex aplanatic system includes an aplanatic plano-convex lens 8 and, cemented to the planar side thereof, a flat glass plate 9. The planar side of glass plate 9 facing plano-convex lens 8 is cemented to the planar face of plano-concave lens 7.

Plano-convex lens 8 comprises a glass having a high refractive index, so does plano-concave lens 7. Plano-convex lens 6, on the other hand, consists of a glass having a refractive index which is substantially less as compared to the refractive index of plano-concave lens 7. Glass plate 9 has an intermediate or medium refractive index.

All lenses 6, 7, and 8 of the block, further comrising the glass plate 9, are spherical.

The spherically convex exit face 10 of aplanatic system 5 is followed, in the further course of the beam path between this aplanatic system and the image plane, by a deflection line mirror 13 having a flat reflelctive face 14, which reflects the deflection plane onto the spherical, reflecting face 12 of the field flattening mirror 11, which in turn points to the image plane.

This arrangement includes, in the entrance beam path before the polygon, an objective lens 15 and a dispersing lens 16 serving, inter alia, for a pre-correction of the spherical aberration of the deflection system. An intermediate image plane into which the character laser points are projected by a thin parallel laser beam bundle, is designated by 17.

Starting from intermediate image plane 17, the laser beam bundle thus travels via dispersion lens 16, objective lens 15 and polygon 1 into the concave aplanatic system 4. The near point P is the virtual origin for the aplanatic system 5. The concave aplanatic system projects the image of the character laser point into the virtual near point P.

The plano-convex lens 8 which is aplanatic with respect to the near point P focuses the near point P onto a curved line 23 behind field flattening mirror 11. The curved line is not shown in FIG. 1, it is however depicted in FIG. 2.

From the field flattening mirror, the curved line is projected as a straight deflection line 18, momentarily in position 19 of the deflection line.

Sample numerics of the various elements of an embodiment of the invention as shown in FIG. 1 are as follows:

r1(16)=plane
d(16)=2.00 mm
r2(16)=−24.27 mm
d(16,15)=0.30 mm
r1(15)=18.73 mm
d(15)=1.10 mm
r2(15)=15.90 mm
d(15,1)=100.00 mm
r(1)=plane
d(1,6)=27.00 mm
r1(6)=plane
d(6)=35.00 mm
r2(6)=−78.74
d(6,7)=0.00 mm
r1(7)=−78.74 mm
d(7)=18.00 mm
r2(7)=plane d(7,9)=0.00 mm
r1(9)=plane
d(9)=30.00 mm
r2(9)=plane
d(9,8)=0.00 mm
r1(8)=plane
d(8)=30.00 mm
r2(8)= −157.23 mm
d(8,13)=200.00 mm
r(13)=plane
d(13,12)=93.05 mm
r(12)= −1127.40 mm
n(16)=1.52
n(15)=1.76
n(6)=1.51
n(7)=1.68
n(9)=1.68
n(8)=1.68 where, in explanation of these numerics, r1(16) is the radius of the concave surface of the dispersion lens 16; d(16) is the effective thickness of the dispersion lens 16; r2(16) is the radius of the convex surface of the dispersion lens 16; d(16,15) is the optically effective distance between the objective lens 15 and the dispersion lens 16; r(1) is the radius of the surfaces of the polygon 1; r(12) is the radius of the reflecting face 12 of the field flattening mirror 11; (n) are the refractive indices of the respective numbered optical elements; and so on for the numerics of the remaining elements.

In order to keep the glass thickness of plano-convex lens 8 as small as possible and to obtain the desired high exactness of the curved line focused by this plano-convex lens, the intermediate space between the plano-convex lens 8 and the first aplanatic system 4 is filled by glass plate 9. The astigmatism caused by this glass plate 9 may suitably be reduced by focusing the beam bundle introduced into the system formed by the aplanatic system so that it deviates to a small extent from the indefinite value. A remaining amount of the astigmatism may compensate for the astigmatism of polygon 1 or the scanning mirror, respectively. The coma of the scanning mirror is compensated for by an opposed coma of the first plano-convex lens 8 in that the influence of the aplanatic properties of the two aplanatic systems on the exit surface 10 of plano-convex lens 9 is correspondingly adjusted.

Figure 2:
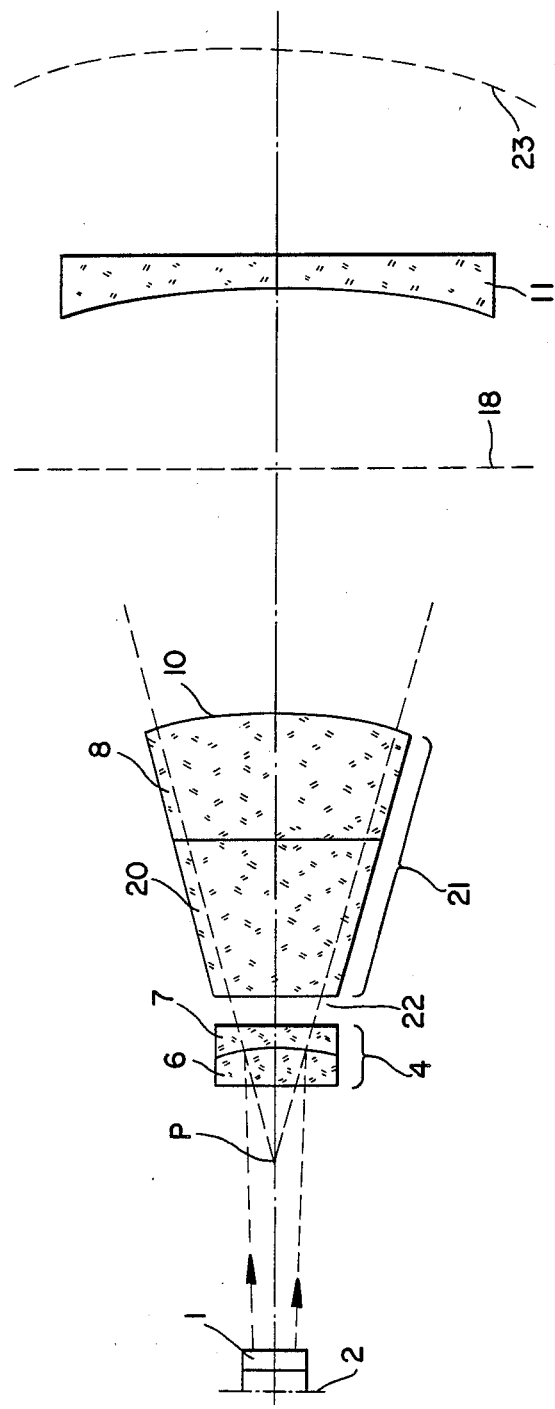
FIG. 2 is an enlarged section through an opto-mechanical deflector of a second embodiment.

The second embodiment of the optical system according to FIG. 2 differs from the above-described optical system according to FIG. 1 essentially in that a glass plate 20 has a high refractive index and has one face cemented to the flat plane of plano-convex lens 8 while the other face is oriented to an air gap 22, which is between the flat plane of glass plate 20 and the opposite flat plane of plano-concave lens 7 of first aplanatic system 4.

The effect of the two aplanatic systems 4 and 21, however, remains in principle the same as the one of aplanatic systems 4 and 5. By plano-convex lens 8, in particular, the near point P which is generated by the first aplanatic system 4, is again focused by plano-convex lens 8 onto a curved line 23 behind field flattening mirror 11 so that this field flattening mirror projects the curved line as a straight deflection line 18 into the image plane.

The numerics of the various elements of the embodiment of the invention as shown in FIG. 2 are as follows:
r1(1)=plane
d(1,6)=27.00 mm
r1(6)=plane
d(6)=35.00 mm
n(6)=1.51
r2(6)=r1(7)= −78.74 mm
d(7)=18.00 mm
n(7)=1.68
r2(7)=plane
d(22)=11.66 mm
r1(20)=plane
d(20)=30.00 mm
n(20)=1.77
r2(20)=r1(8)=plane
d(8)=30.00 mm
n(8)=1.68
r2(8)=178.60 mm
d(10,11)=259.22 mm
r(11)= −1227.00 mm where the notation convention is the same as appears above for FIG. 1.

While there has been described what are believed to be the preferred embodiments of the invention, those skilled in the art will recognize that various changes and modifications may be made thereto without departing from the spirit of the invention, and it is intended to claim all such embodiments as fall within the true scope of the invention.

I claim:

1. Opto-mechanical deflector with at least one rotatable or slewable scanning mirror arranged to be struck by a substantially parallel beam bundle which is focused onto a flat image lane by way of a first plano-convex lens arranged near it, the convex face of which is traversed substantially at right angles by the reflected beam, thereby forming a—second—aplanatory system, and by way of a concave mirror arranged near the image plane,
    characterized in that a first aplanatic system is provided between the first plano-convex lens (8) and the scanning mirror (1) and that the first aplanatic system (49 consists of a plano-concave lens (7), having a refractive index substantially identical to that of the first plano-convex lens (8), and of a second plano-convex lens (6), cemented to the concave face of the plano-concave lens (7) and having a refractive index substantially less than that of said plano-concave lens (7).

2. Opto-mechanical deflector according to claim 1, characterized in that the range of refractive indices for the first plano-convex lens (8) is from 1.6 to 1.95 and that the range of refractive indices for the second plano-convex lens (6) is from 1.45 to 1.55.

3. Opto-mechanical deflector according to claim 2,
    characterized in that the refractive index for the first plano-convex lens (8) is 1.68.

4. Opto-mechanical deflector according to claim 2 or 3,
    characterized in that the refractive index for the second plano-convex lens (6) is 1.51.

5. Opto-mechanical deflector as in one of claims 1, 2 or 3
    characterized in that a glass plate (9;20) is arranged between the plano-concave lens (7) and the first plano-convex lens (8), saiid glass plate being cemented to the flat face of the first plano-convex lens (8).

6. Opto-mechanical deflector according to claim 5, characterized in that said glass plate (20) has a high refractive index which is at least as high as that of the first plano-convex lens (8) and that an air gap is provided between said glass plate (20) and the flat plane of the plano-concave lens (7) of the first aplanatory system (4) (FIG. 2).

7. Opto-mechanical deflector as in one of claims 2 or 3 characterized in that said glass plate (9) has a medium refractive index, ranging between those of the first plano-convex lens (8) and the second plano-convex lens (6), and that said glass plate (9) is cemented to the flat plane of the plano-concave lens (7) of the first aplanatory system (4) (FIG. 1).

* * * * *